US010776448B2

(12) United States Patent
McKinnon et al.

(10) Patent No.: US 10,776,448 B2
(45) Date of Patent: Sep. 15, 2020

(54) CELL-BASED COMPUTING AND WEBSITE DEVELOPMENT PLATFORM

(71) Applicant: STEEPSTREET, LLC, Boulder, CO (US)

(72) Inventors: Clarke McKinnon, Boulder, CO (US); Jeff McKinnon, Boulder, CO (US); John Wright, Broomfield, CO (US)

(73) Assignee: STEEPSTREET, LLC, Boulder, CO (US)

(*) Notice: Subject to any disclaimer, the term of this patent is extended or adjusted under 35 U.S.C. 154(b) by 0 days.

(21) Appl. No.: 16/444,924

(22) Filed: Jun. 18, 2019

(65) Prior Publication Data

US 2019/0384797 A1  Dec. 19, 2019

Related U.S. Application Data

(60) Provisional application No. 62/686,496, filed on Jun. 18, 2018.

(51) Int. Cl.
| G06F 16/958 | (2019.01) |
| G06F 9/54 | (2006.01) |
| G06F 16/27 | (2019.01) |
| G06F 40/154 | (2020.01) |

(52) U.S. Cl.
CPC .............. *G06F 16/958* (2019.01); *G06F 9/54* (2013.01); *G06F 16/27* (2019.01); *G06F 40/154* (2020.01)

(58) Field of Classification Search
CPC ............................... G06F 40/18; G06F 16/958
See application file for complete search history.

(56) References Cited

U.S. PATENT DOCUMENTS

| 6,988,241 B1 * | 1/2006 | Guttman ................. G06F 40/18 715/220 |
| 7,668,870 B1 * | 2/2010 | Sykes ................... G06F 16/958 707/690 |
| 2004/0199543 A1 * | 10/2004 | Braud .................... G06Q 10/06 |
| 2011/0125706 A1 * | 5/2011 | Barber .................. G06F 16/283 707/602 |
| 2013/0151938 A1 * | 6/2013 | Waldman ................ G06F 40/18 715/210 |
| 2019/0138194 A1 * | 5/2019 | Ryan ..................... G06F 16/958 |
| 2020/0005902 A1 * | 1/2020 | Mellen ................... G16B 20/40 |

* cited by examiner

*Primary Examiner* — Asher D Kells
(74) *Attorney, Agent, or Firm* — Berg Hill Greenleaf Ruscitti LLP.

(57) ABSTRACT

The invention relates to a cell-based computing platform that may be specifically used for website development and management. This cell-based computing platform may further be responsive to an external device, program, or operation such that changes in the value parameter of one or more cells may dynamically trigger an external response.

21 Claims, 15 Drawing Sheets

CELL-BASED COMPUTING AND WEBSITE DEVELOPMENT PLATFORM

CROSS-REFERENCES TO RELATED APPLICATION

This application claims the benefit of and priority to U.S. Provisional Application No. 62/686,496, filed Jun. 18, 2018, which is incorporated herein by reference in its entirety.

TECHNICAL FIELD

The present invention relates to a cell-based computing system that may be responsive to an external device, program, or operation such that changes in the value parameter of one or more cells may dynamically trigger an external response

BACKGROUND

The vast majority of user engagement with the Internet, especially for the average individual, is through webpages and websites. A website is a set of related webpages served from a single web domain, and is hosted on at least one web server, accessible via a network such as the Internet or a private local area network through an Internet address known as a Uniform Resource Locator (URL). All publicly accessible websites collectively constitute the World Wide Web. Each webpage is a document, typically written in plain text interspersed with formatting instructions in a language, e.g. Hypertext Markup Language (HTML, XHTML). Webpages may incorporate elements from other websites with suitable markup anchors as well as links to other webpages on the same website or other websites, the latter being typically accessed via hypertext links.

In order to view information, a user launches an application, often referred to as a web browser, and navigates to a webpage through a search or a stored link. The web browser renders the page content according to its HTML markup instructions onto a display terminal, where the content and HTML markup instructions have been transported with the Hypertext Transfer Protocol (HTTP), which may optionally employ encryption (HTTP Secure, HTTPS) to provide security and privacy for the user of the webpage content. The URLs of the pages organize them into a hierarchy, although hyperlinking between them conveys the reader's perceived site structure and guides the reader's navigation of the site which generally includes a home page with most of the links to the site's web content, and a supplementary about, contact and link page. However, irrespective of the content, the structure, the website, of every single webpage on every single website has to be generated. Whilst, some webpages may display results from searches, these search results are webpages or portions of webpages. With an estimated 200 million active websites, that is a vast amount of human resources applied to the design, layout, and configuration of those webpages.

At present, creating a website generally involves two primary jobs, the web designer and the web developer, who often work closely together on a website. The web designer would typically be responsible for the visual aspect, which includes the layout, coloring, and typography of a webpage, while a web developer may be responsible for the technical aspects of the website and its function. For example, a web developer may use a variety of coding languages such as HTML, Cascading Style Sheets (CSS), JavaScript, PHP (a server-side scripting language), and Flash to create a site and its functionality. Particularly, in smaller organizations, one person will need the necessary skills for designing and programming the full webpage, while larger organizations may have a web designer responsible for the visual aspect alone. In other particular circumstances, other individuals may become involved during the creation of a website including, for example, graphic designers (to create visuals for the site such as logos, layouts and buttons), Internet marketing specialists (who help maintain web presence through strategic solutions targeting viewers), search engine optimizers (SEOs), who research/recommend website language to increase website visibility on search engines), Internet copywriters (to create the written content), and user experience (UX) designers (who address end-user design considerations).

As a result, establishing a website whilst being a major, often vital, element of an enterprise's or organization's strategy, can be an expensive proposition which is not helped by the need to support both desktop and mobile users as well as potentially supporting multiple languages to address users in different geographical regions. Due to the lower bandwidth, reduced display capabilities, and typically lower processor capabilities, a mobile webpage/website is generally less complex and less graphically intensive than a desktop webpage/website.

Accordingly, over the past decade whilst professional design tools for webpages/websites have improved, a parallel development has occurred that is geared for the individual, the smaller enterprise, etc. wherein they can design and implement a website and its webpages through the use of templates that are pre-configured, thereby removing the requirements of the user to understand web design and development tools. In many instances, these are discrete third party services but increasingly these are bundled as part of an overall package from specialty web-site development and hosting businesses.

However, this leaves the user with essentially two options. The first, with full creative control and flexibility is to exploit web developers and website development enterprises to generate exactly what they want. The second is to select a template from those offered by web-site development and hosting businesses and work within its constraints. The former is typically suited to established enterprises that can justify the marketing budget and quantify the return on investment whilst the latter is typically employed by small and new enterprises, individuals, etc., to establish a web presence without incurring significant costs for unknown return on investment. Accordingly, it would be beneficial to provide users with the ability to establish a webpage and/or website with a design that they want within a platform technology that they find easy and intuitive to use.

It would be further beneficial for a user, when generating their webpage(s) and/or website(s) to be able to rapidly edit and have those edits available online once they have been completed rather than awaiting their service provider's upload of modified content. It would be further beneficial for the user to be able to rapidly add extended features to their website. Moreover, it may be beneficial to be able to create and host a website on a server-less platform, such that the design and function of a website is maintained in a cloud environment. Finally, it may further be beneficial if a user may integrate a software platform technology to link various other devices and processes that could be individually controlled, programmed and/or triggered in a singular or cascading fashion.

As outlined below, the present inventors provide for a cell-based computing and web development platform that addresses the shortcoming and problems with traditional systems described above.

SUMMARY OF THE INVENTION

It is one aim of the current invention to generate a cell-based computing system. In one preferred embodiment, a cell-based software computing system may include systems and methods for associating one or a plurality of discrete executable commands to a cell or series of cells. The management of the execution of the cell's function may make use of a computing device, such as local computer, and/or cloud-based processing architecture. Such cells may operate in an open or secure environment and may further be operable on a general use computer platform, or other mobile computing device, such as a tablet or phone.

Another aim of the invention may include a cell-based computing platform comprising a plurality of independent and/or linkable cells. In this preferred embodiment, each cell may be configured to express or execute one or more functions that may further correspond with a value or plurality of values. In another preferred embodiment, the invention may include a cell-based computing platform comprising a plurality of nested and/or linked cells that may each be associated with a value. Such nested and/or linked cells may be further associated with a cell unit that may further generate, for example, a function, action or reaction in response to the nested and/or linked values associated with the cell.

Another aim of the invention may include the generation of a cell-based computing platform wherein one or a plurality of cells may be programmed to express one or more values that may correspond to a discrete function. In this preferred embodiment, a cell may be assigned an input value, or value that when executed will generate a signal to execute a discrete function or series of functions. In certain embodiments, the execution of a specific function may be associated with a single cell and/or value, while in alternative embodiments the execution of a specific function may be associated with a plurality of linked and/or nested cells. In this embodiment, the function may correspond to the inputted value or value range.

Another aim of the invention may include the generation of a cell-based computing platform wherein one or a plurality of cells may be programed to express one or more values that may correspond to a discrete action. In this preferred embodiment, a cell may be assigned an input value or value that when executed, will generate a signal to execute a discrete action or series of actions. In certain embodiments, the execution of a specific action may be associated with a single cell and/or value, while in alternative embodiments execution of a specific action may be associated with a plurality of linked and/or nested cells. In this embodiment, the action may correspond to the inputted value or value range.

Another aim of the invention may include the generation of a cell-based computing platform wherein one or a plurality of cells may be programmed to express one or more values that may correspond to a discrete reaction. In this preferred embodiment, a cell may be assigned an input value or value that when executed will generate a signal to execute a discrete reaction or series of reactions. Here, a reaction may include the physical change in a mechanical, electrical, digital or other external device or component. In certain embodiments, one or more cells may be operably linked with an API (application programming interface) or other compatible software intermediary. In certain embodiments, the execution of a specific reaction may be associated with a single cell and/or value, while in alternative embodiments execution of a specific reaction may be associated with a plurality of linked and/or nested cells. In this embodiment, the reaction may correspond to the inputted value or value range.

Another aim of the invention may include a cell-based computing platform that may be utilized as a web development platform. In this preferred embodiment, one or a plurality of cells may be programmed to express one or more values that may correspond to a discrete website module. In this preferred embodiment, a website module may include a visual output function such as text, video and/or images, as well as placement and design. A website module may also include additional executable functions, actions and/or reactions as generally described above. Again, in this embodiment, a cell may be assigned an input value or parameter that when executed may generate a signal to execute a discrete website module or a series of website modules. In certain embodiments, the execution of a specific website module may be associated with a single cell and/or value while in alternative embodiments, execution of a specific website module may be associated with a plurality of linked and/or nested cells. In this embodiment, the website module may correspond to the inputted value or value range.

Another aim of the invention may include a cell-based computing platform that may be utilized as a cloud-based web development platform. In this preferred embodiment, one or a plurality of cells may be programmed to express one or more values that may correspond, and/or be responsive to a discrete website module. As noted above, a website module may include a visual output function such as text, video and/or images, as well as placement and design. A website module may also include additional executable functions, actions and/or reactions as generally described above. Moreover, such website module(s) may be stored in a cloud-based database or other cloud-based storage system such that when a value is inputted, the website module may be modified in-real-time without the need for server-based hosting and updating. In this embodiment, a standard browser program may resolve and display the website module according to the cell's value or parameter.

Another aim of the current invention may include a computer executable software platform that may be hosted and/or stored on a cloud-based database or other cloud-based storage system and may be executable on a general computing device, such as a general use computer, mobile phone, tablet and the like.

Another aim of the invention may include a cell-based computing platform that may incorporate a dynamic triggering system. In this embodiment, one or more first cells may be associated or linked to one or more second cells. In this embodiment, the value of a first cell may be initially static or in a null status. When the value of this first cell is modified, it may cause the value of one, or a plurality of linked cells to also change their initial values, or populate a new value. Such dynamic triggering may propagate through a cascade of dynamically dependent cells. In a preferred embodiment, a dynamically dependent cell may further generate a function, action, or reaction.

In an alternative embodiment, the invention may include a cell-based computing platform that may incorporate a dynamic triggering system that may be generated by a function, action or reaction. In this embodiment, a function, action or reaction may be associated or linked to one or more cells. In this embodiment, the execution of a function, action or reaction may alter the value of one, or a plurality of linked cells, changing their initial values, and/or populating a new value. Such dynamic triggering may propagate through a cascade of dynamically dependent cells. In one embodiment, a dynamically dependent cell may further generate a new function, action, or reaction.

Another aim of the invention may include a cell-based computing platform wherein each cell may accept or be associated with executable source code. In this embodiment, a cell may include its own executable source-code that may be configured to execute one or more functions, actions or reactions. In certain preferred embodiments, one or more cells may be operably linked with an API or other compatible software intermediary that may further allow the execution of a reaction that may be operated by a separate system. Another aim of the invention may include a cell-based computing and web development platform that does not utilize CSS code and/or architecture. In this embodiment, each cell may be configured to be associated with one or more values that may again, correspond to a website module, or function, action or reaction, wherein each cell is not dependent on CSS code to translate and/or describe a website's visual presentation and/or layout.

Additional preferred embodiments may include a first embodiment comprising a cell-based computing system comprising: a computer having an executable program configured to generate and display a plurality of individual cells wherein each cell is assigned an initial value and wherein said initial values are retain in a cloud-based database; a user interface wherein a user may modify said initial value of one or more of said plurality of cells wherein said modification of said initial value of a cell is communicated and retained in said cloud-based database; wherein said modification of said initial value of one or more of said plurality of cells generates a signal from said cloud-based database which is received by said executable program and generates a signal that initiates a function, an action or a reaction that is executed according to the new value of one or more of said cells; and wherein said step of initiating said function, action or reaction is accomplished without communication with a physical server.

Additional embodiments may include the cell-based computing system of the above embodiment of the invention wherein said step of initiating said function, action or reaction comprises the step of generating a signal that communicates with an application programming interface (API).

Additional embodiments may include the cell-based computing system of the above embodiment of the invention wherein said API, in response to said signal, generates a signal that is communicated to an external device.

Additional embodiments may include the cell-based computing system of the above embodiment of the invention wherein said a signal, generated by an API communicated to an external device causes said external device to perform a function.

Additional embodiments may include the cell-based computing system of the above embodiment of the invention wherein said function performed by said external device may be selected from the group consisting of: turning itself on, turning itself on, sending a signal to another external device; initiating a computer executable program; initiating a computer executable program that generates a change in the value of one or more said plurality of cells.

Additional embodiments may include the cell-based computing system of the above embodiment of the invention wherein said plurality of individual cells comprises a plurality of nested cells.

Additional embodiments may include the cell-based computing system of the above embodiment of the invention wherein said plurality of nested cells comprises a plurality of nested cells that may be dynamically triggered.

Additional embodiments may include the cell-based computing system of the above embodiment of the invention wherein said function comprises a visual output function.

Additional embodiments may include the cell-based computing system of the above embodiment of the invention wherein said visual output function is rendered independently of a CSS code function.

Additional embodiments may include the cell-based computing system of the above embodiment of the invention wherein said cell-based computing system comprises a CSS code free wherein said cell-based computing system.

Additional embodiments may include the cell-based computing system of the above embodiment of the invention wherein said a user interface wherein a user may modify said initial value of one or more of said plurality of cells comprises an automated user interface wherein a user may modify said initial value of one or more of said plurality of cells.

Additional embodiments may include a cell-based website development system configured to generate and render a website for display without a server comprising: a computer having an executable program configured to generate and display a plurality of individual cells wherein each cell is assigned an initial value and wherein aid initial values are retain in a cloud-based database; one or more website modules configured to be responsive to the value of one or more of said individual cells; a user interface wherein a user may modify said initial value of one or more of said plurality of cells wherein said modification in said initial value of a cell is communicated and retained in said cloud-based database; wherein the modification of said initial value of one or more of said plurality of cells generates a signal from said cloud-based database which is received by said executable program and causes a change in the operation of said one or more website modules and wherein said change in the operation of said one or more website modules is rendered by said computer's browser program as a website display and wherein said step of rendering said website display is accomplished without a physical server.

Additional embodiments may include the cell-based website development system of the above embodiment of the invention and further comprising the step wherein the modification of said initial value of one or more of said plurality of cells generates a signal from said cloud-based database which is received by said executable program and initiates a function, action or reaction.

Additional embodiments may include the cell-based website development system of the above embodiment of the invention wherein said step of initiating said function, action or reaction comprises the step of generating a signal that communicates with an application programming interface (API).

Additional embodiments may include the cell-based website development system of the above embodiment of the invention wherein said API, in response to said signal, generates a signal that is communicated to an external device.

Additional embodiments may include the cell-based website development system of claim 15 wherein said a signal, generated by an API communicated to an external device causes said external device to perform a function.

Additional embodiments may include the cell-based website development system of the above embodiment of the invention wherein said function performed by said external device may be selected from the group consisting of: turning itself on, turning itself on, sending a signal to another external device; initiating a computer executable program; initiating a computer executable program that generates a change in the value of one or more said plurality of cells.

Additional embodiments may include the cell-based website development system of the above embodiment of the invention wherein said plurality of individual cells comprises a plurality of nested cells.

Additional embodiments may include the cell-based website development system of the above embodiment of the invention wherein said plurality of nested cells comprises a plurality of nested cells that may be dynamically triggered.

Additional embodiments may include the cell-based website development system of the above embodiment of the invention wherein said step of rendering said website display is rendered independently of a CSS code function.

Additional embodiments may include a dynamic cell-based computing system comprising: a computer having an executable program configured to generate and display a plurality of first cells wherein each first cell is assigned an initial value and wherein said initial values are retain in a cloud-based database; a computer having an executable program configured to generate and display a plurality of second cells wherein each second cell is assigned an initial value and wherein aid initial values are retain in a cloud-based database and further responsive to one or more of said plurality of first cells and wherein said initial values of said plurality of second cells are retain in a cloud-based database; a user interface wherein a user may modify said initial value of one or more of said plurality of first cells wherein said modification of said initial value of a cell is communicated to said plurality of second cells causing a modification in the assigned initial value of one or more plurality of second cell and wherein the modified values of said first and second plurality of calls is communicated and retained in said cloud-based database; wherein said modification of said initial value of one or more of said plurality of cells generates a signal from said cloud-based database which is received by said executable program and generates a signal that initiates a function, an action or a reaction that is executed according to the new value of one or more of said cells; and wherein said step of initiating said function, action or reaction is accomplished without communication with a physical server.

Other aspects and features of the present invention will become apparent to those ordinarily skilled in the art upon review of the following descriptions of specific embodiments of the invention in conjunction with the accompanying figures.

DETAILED DESCRIPTION OF THE INVENTION

The current invention includes a cell-based computing system (1). In one preferred embodiment, a cell-based software computing system (1) may include systems and methods for associating one or a plurality of discrete executable commands to a cell (2) or series of cells (2). The management of the execution of the cell's (2) function may make use of a computing device (3), such as local computer, and/or cloud-based processing architecture. Such cells (2) may operate in an open or secure environment and may further be operable on a general use computer platform, or other mobile computing device, such as a tablet or phone.

Figure 1:
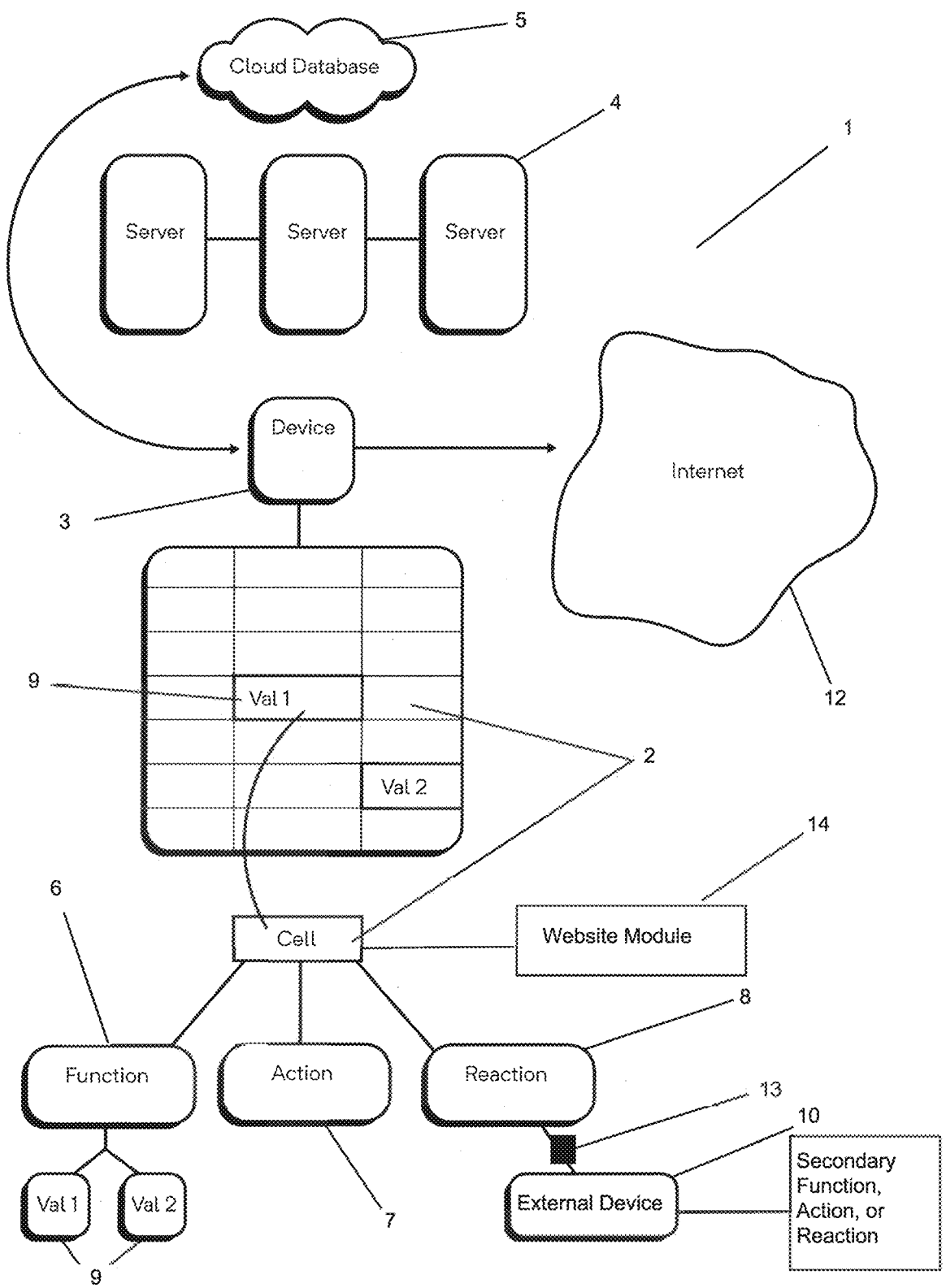
FIG. 1—is a generalized diagram of a cell based computing platform in one embodiment thereof.
Figure 2:
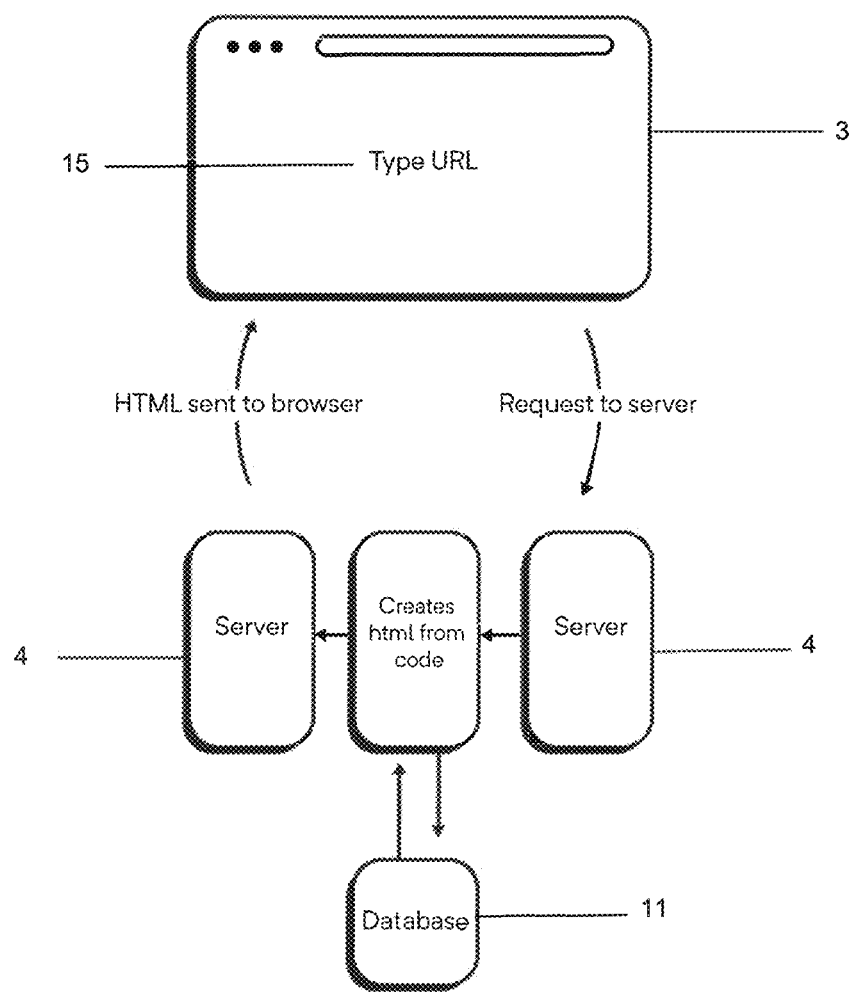
FIG. 2—is a generalized diagram of how a typical server-based website is hosted and displayed.
Figure 3:
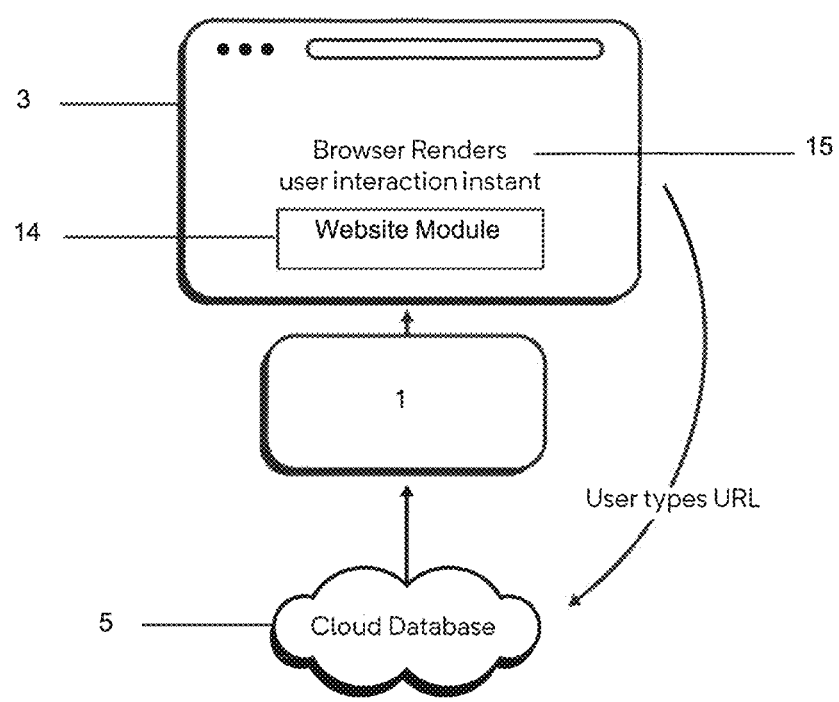
FIG. 3—is a generalized diagram of a cell based computing platform that may be utilized as a website development and management system to generate a cloud-based website that is rendered by a user's browser and that does not require traditional server-based web hosting.

As shown in FIGS. 1-3, the invention may further include a cell-based computing system (1) comprising a plurality of independent and/or linkable cells (2). In this preferred embodiment, each cell may be configured to express or execute one or more functions (6) that may further correspond with a value (9) or plurality of values (9). In another preferred embodiment, the invention may include a cell-based computing system (1) comprising a plurality of nested and/or linked cells (2) that may each be associated with a value (9). Such nested and/or linked cells may be further associated with a cell unit that may further generate, for example, a function, action or reaction in response to the nested and/or linked values associated with the cell.

As shown in FIGS. 1-3, additional embodiments of the invention may include the generation of a cell-based computing system (1) wherein one or a plurality of cells (2) may be programmed to express one or more values (9) that may correspond to a discrete function (6). In this preferred embodiment, a cell may be assigned an input value (9), or value that when executed will generate a signal to execute a discrete function (9) or series of functions. In certain embodiments, the execution of a specific function (9) may be associated with a single cell (2) and/or value (9), while in alternative embodiments the execution of a specific function (6) may be associated with a plurality of linked and/or nested cells (2). In this embodiment, the function (6) may correspond to the inputted value (9) or value range.

Another embodiment of the invention may include the generation of a cell-based computing system (1) wherein one or a plurality of cells (2) may be programed to express one or more values that may correspond to a discrete action (7). In this preferred embodiment, a cell may be assigned an input value (9) or value that when executed, will generate a signal to execute a discrete action (9) or series of actions. In certain embodiments, the execution of a specific action (9) may be associated with a single cell (2) and/or value (9), while in alternative embodiments execution of a specific action (7) may be associated with a plurality of linked and/or nested cells. In this embodiment, the action (7) may correspond to the inputted value (9) or value range.

As shown in FIGS. 1-3, another embodiment of the invention may include the generation of a cell-based computing system (1) wherein one or a plurality of cells (2) may be programmed to express one or more values (9) that may correspond to a discrete reaction (8). In this preferred embodiment, a cell (2) may be assigned an input value or value (9) that when executed will generate a signal to execute a discrete reaction (8) or series of reactions. Here, a reaction may include the physical change in a mechanical, electrical, digital or other external device or component. In certain embodiments, one or more cells (2) may be operably linked with an application programming interface (API) (13) or other compatible software intermediary. In certain embodiments, the execution of a specific reaction (8) may be associated with a single cell (2) and/or value (9), while in alternative embodiments execution of a specific reaction (8) may be associated with a plurality of linked and/or nested cells. In this embodiment, the reaction (8) may correspond to the inputted value or value range.

As shown in FIGS. 1-3, another embodiment of the invention may include a cell-based computing system (1) that may be utilized as a web development platform. In this preferred embodiment, one or a plurality of cells (2) may be programmed to express one or more values (9) that may correspond to a discrete website module (14). In this preferred embodiment, a website module (14) may include a visual output function such as text, video and/or images, as well as placement and design. A website module (14) may also include additional executable functions (6), actions (7) and/or reactions (8) as generally described above. Again, in this embodiment, a cell (2) may be assigned an input value (9) or parameter that when executed may generate a signal to execute a discrete website module (14) or a series of website modules (14). In certain embodiments, the execution of a specific website module (14) may be associated with a single cell (2) and/or value (9), while in alternative embodiments execution of a specific website module (14) may be associated with a plurality of linked and/or nested cells. In this embodiment, the website module (14) may correspond to the inputted value (9) or value range.

As shown in FIGS. 1-3, one embodiment of the invention may include a cell-based computing system (1) platform that may be utilized as a cloud-based web development platform. In this preferred embodiment, one or a plurality of cells (2) may be programmed to express one or more values (9) that may correspond, and/or be responsive to a discrete website module (14). As noted above, a website module may include a visual output function such as text, video and/or images, as well as placement and design. A website module (14) may also include additional executable functions, actions and/or reactions as generally described above. Moreover, such website module(s) may be stored in a cloud-based database (5) or other cloud-based storage system such that when a value (9) is inputted, the website module (14) may be modified in-real-time without the need for server-based hosting and updating. In this embodiment, a standard browser program (15) may resolve and display the website module according to the cell's value or parameter.

Another embodiment of the current invention may include a computer executable software platform that may be hosted and/or stored on a cloud-based database (5) or other cloud-based storage system and may be executable on a general computing device (3), such as a general use computer, mobile phone, tablet and the like.

Another embodiment of the invention may include a cell-based computing system (1) that may incorporate a dynamic triggering system. In this embodiment, one or more first cells (2*a*) may be associated or linked to one or more second cells (2*b*). In this embodiment, the value (9) of a first cell (2*a*) may be initially static or in a null status. When the value (9) of this first cell (2*a*) is modified, it may cause the value (9) of one, or a plurality of linked second cells (2*b*) to also change their initial values (9), or populate a new value. Such dynamic triggering may propagate through a cascade of dynamically dependent cells. In a preferred embodiment, a dynamically dependent cell may further generate a function (6), action (7), or reaction (9) as generally described herein.

In alternative embodiments, the invention may include a cell-based computing system (1) that may incorporate a dynamic triggering system that may be generated by a function (6), action (7), or reaction (8). In this embodiment, a function (6), action (7), or reaction (8) may be associated or linked to one or more cells (2). In this embodiment, the execution of a function (6), action (7), or reaction (8) may alter the value (9) of one, or a plurality of linked cells (2), changing their initial values, and/or populating a new value. Such dynamic triggering may propagate through a cascade of dynamically dependent cells. In one embodiment, a dynamically dependent cell may further generate one or more new functions (6), actions (7), or reactions (8).

Another embodiment of the invention may include a cell-based computing system (1) wherein each cell (2) may accept or be associated with executable source code. In this embodiment, a cell (2) may include its own executable source-code that may be configured to execute one or more function (6), action (7), or reaction (8). In certain preferred embodiments, one or more cells (2) may be operably linked with an API (13) or other compatible software intermediary that may further allow the execution of a secondary or independent function (6), action (7), or reaction (8) that may be operated by a separate system.

Another aim of the invention may include a cell-based computing system (1) that may further be directed to a web development platform that does not utilize CSS code and/or architecture. In this embodiment, each cell (2) may be configured to be associated with one or more values (9) that may again, correspond to a website module (14), or function (6), action (7), or reaction (8), wherein each cell is not dependent on CSS code to translate and/or describe a website's visual presentation and/or layout.

Figure 4:
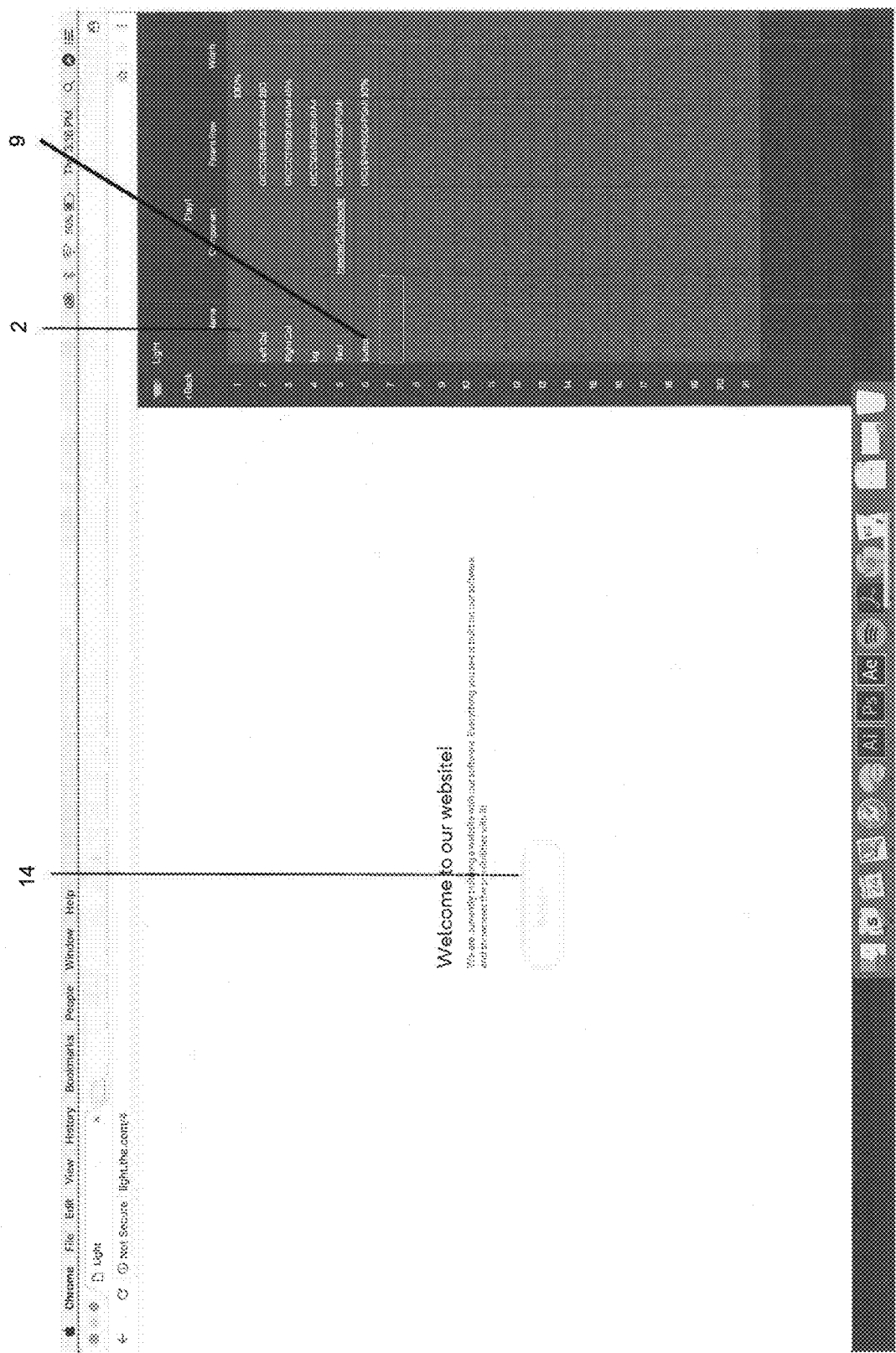
FIG. 4—is a screen capture of a cell-based computing platform as a website development and management system in one embodiment thereof.

In one embodiment the invention may include a cell-based web-development platform. As generally shown in FIGS. 4-15, in one embodiment the cell-based web-development platform may include a plurality of cells (2) configured in a cell matrix. As shown in FIG. 4, the cell matrix may include numbered cell parameters along both a vertical and horizontal axis. In this embodiment, a first column, having the parameter NAME, includes a plurality of cells (2) arranged in a vertical column.

As shown in FIG. 4, five cells in the vertical column have an assigned value (9) or parameter, the terms being generally interchangeable. This value (9) or parameter may reference specific website modules (14) that may be shown on the display. For example, the cell (2) identified in column NAME row 7, includes the specific value (9) or parameter titled BUTTON. As shown on the adjacent display, a website module (14) shown here may include a call to action button. The website module (14), again which in this embodiment call to action button, is operably linked to the corresponding cell and/or row of cells, such that the change in value of one or more operably linked cells may cause a change in the call to action button. In this manner, a change in value (9) or parameter of a cell (2) or plurality of operably linked cells (2) may be used to alter and change a website's configuration and/or display through a website module (14). In a similar manner, as shown in FIG. 4, the other identified cells (2) in the column NAME may also be operably linked to different aspects of the website configuration of display. For example, the cells (2) identified as Left Col. and Right Col. may be operably linked to the left and right columns of the website's display. The cell (2) identified as bg (background) may be operably linked to the website's background display and color. The remaining identified cells (2), or other identified cells (2) that may be used in this example, may operate in generally the same manner.

In a preferred embodiment shown in FIG. 4, the cells (2) of the first column are operably linked with the horizontally adjacent cells (2), identified by column values (9) or parameters COMPONENT, PARENT ROW and WIDTH. Naturally, such identifiers and parameters are provided for exemplary purposes only and should not be construed to be limiting. Moreover, as will be shown below, additional cells (2), including individually identified horizontal columns, may be present and extend beyond the initially visible image. In this embodiment, the cells identified as Left Col. and Right Col. may further be operably linked to the cells (2) of their respective horizontal rows. In this example, the cell (2) identified as RIGHT COL. may be operably linked to the cell identified at column WIDTH, row 3. Here, a value (9) of 45% has been assigned to this cell. This value (9) dynamically triggers the change in the display's right column to be set at 45% of a pre-determined standard.

Figure 5:
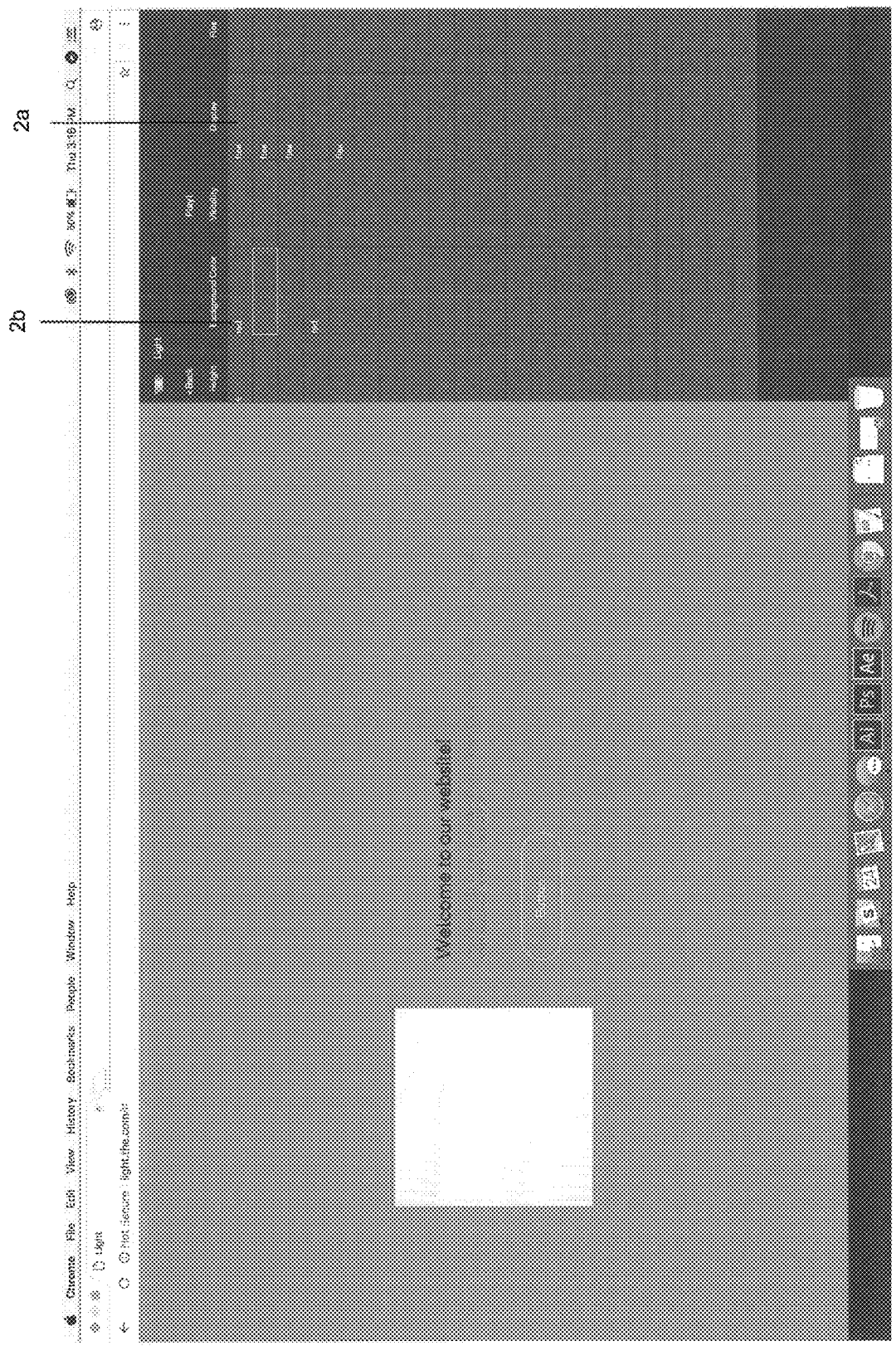
FIG. 5—is a screen capture of a cell-based computing platform as a website development and management system demonstrating a change in the website module responsive to the background color of a website in one embodiment thereof.
Figure 6:
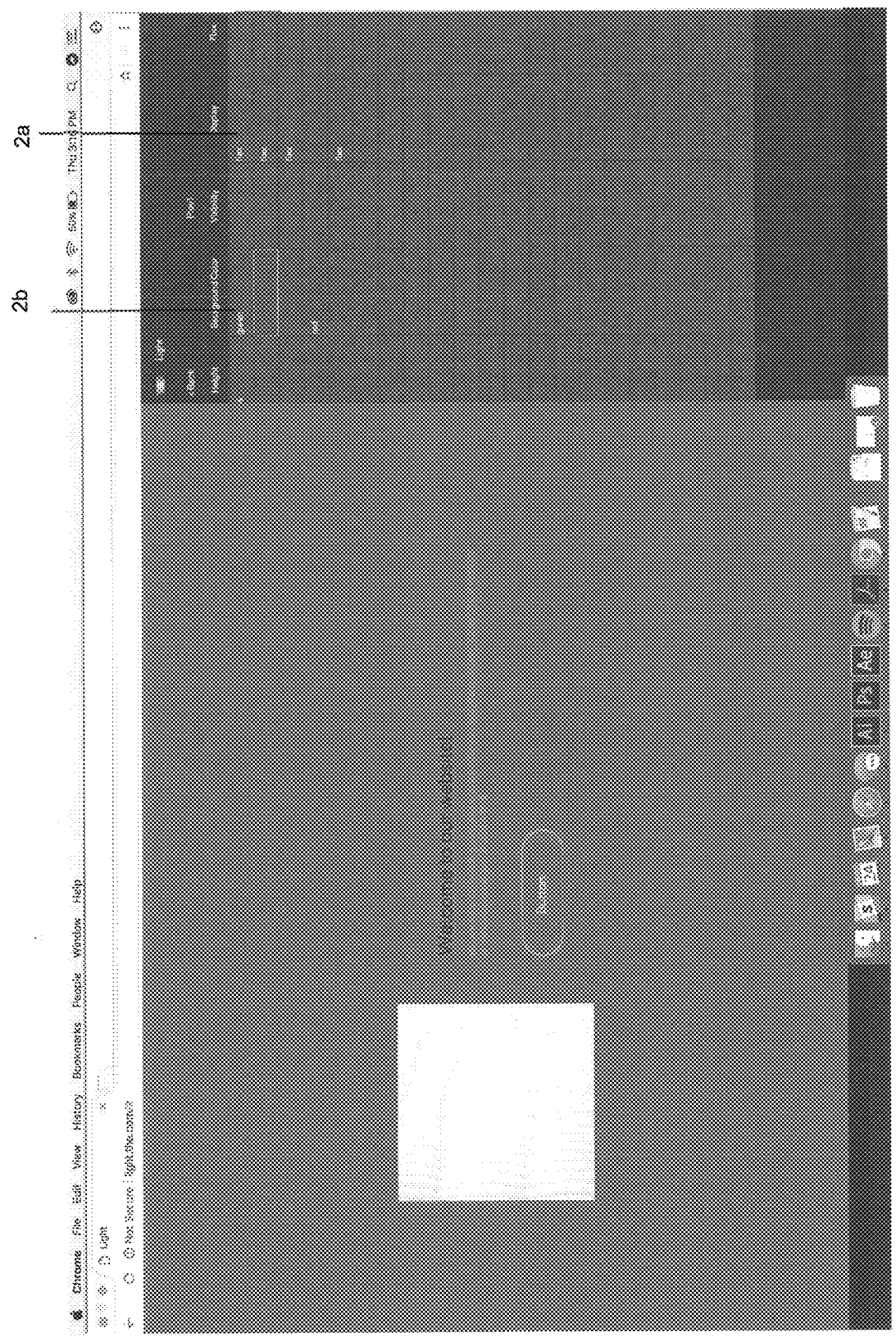
FIG. 6—is a screen capture of a cell-based computing platform as a website development and management system demonstrating a change in the website module responsive to the background color of a website in one embodiment thereof.

Referring now to FIG. 5, in this embodiment, the cell (2) of row 4 column 1, identified herein as a first background cell (2a), may be operably linked to the background color of the website display and may further be operably linked to a second cell (2b). In this embodiment, this first background cell may be operably linked to a second background cell (2b). In this embodiment, the second background cell (2b) may be identified in row 1 and identified under the column entitled BACKGROUND COLOR. This cell, being operably linked to the color of the background, may include a default parameter such that when the cell is in a null set, or lacks a value, the background is displayed as white, or any other color that may be desired by a user. As shown in FIGS. 4-6, in this embodiment, a value (9) of RED or GREEN may be inputted into the second background cell (2b) which causes the website's background to change color from white to red or green respectively.

Figure 7:
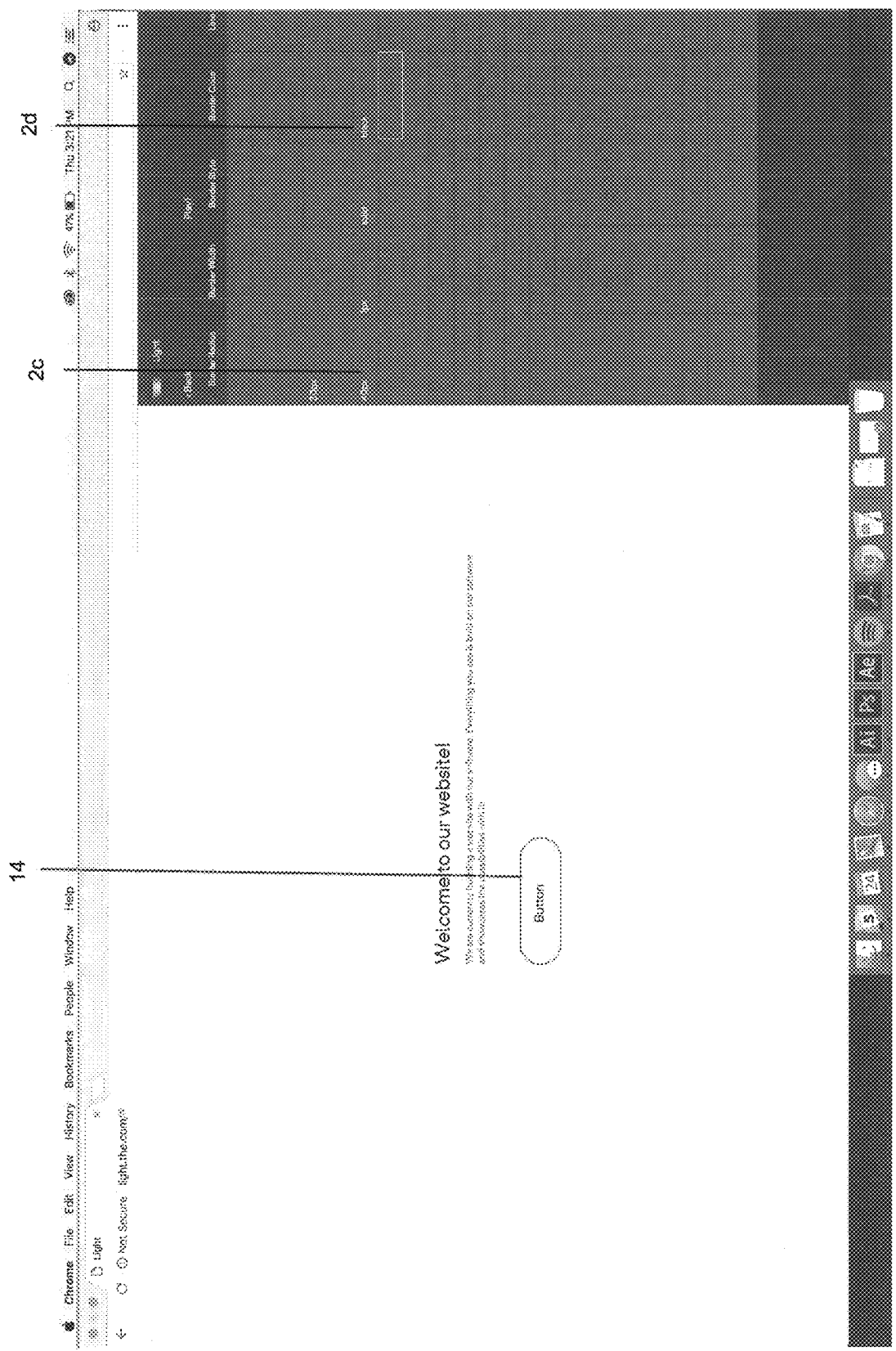
FIG. 7—is a screen capture of a cell-based computing platform as a website development and management system demonstrating a change in the website module responsive to the color of a call to action button in one embodiment thereof.

Referring generally to FIG. 7, in another exemplary embodiment of the cell-based computing system (1) being utilized as a web development platform, the cell of row 7 column 1, identified herein as a first button cell (2c), may be operably linked to the a website module (14), in this case the call to action button of the website display, and may further be operably linked to a plurality of additional cells (2). In this embodiment, this first button cell (2c) may be operably linked to a second button cell (2d) identified in row 6 and identified under the column entitled BORDER COLOR. This second button cell (2d), being operably linked to the color of the call to action button, may include a default parameter such that when the cell is in a null set, or lacks a value, the button is displayed as yellow, or any other color that may be desired by a user. As shown in FIGS. 7, in this embodiment, a value of BLACK may be inputted into the second button cell (2d) which causes the website module (14) corresponding to the call to action button to change color from yellow to black.

In certain embodiments, a first cell may be linked with a plurality of cells that may be operably linked to one or more aspects of a website module (14). Again, as can also be seen in FIGS. 7-8, additional identified columns may include aspects of the button website module, including, but not limited to: BORDER RADIUS, BORDER WIDTH, BORDER STYLE, TEXT, TEXT ALIGNMENT and COLOR and the like. In this embodiment, the cells (2) identified in row 6 under each of these identified columns may be operably linked to the identified aspect of the website module (14). Under this configuration, the cell (2) values (9) for the website module (14) corresponding to the displayed call to action button may be operably linked to the website display to generate a call to action button with: a border radius of "40 px;" a border width of "1 px;" a border style of "solid;" a text that reads "Button" in a horizontal orientation; and a black or red colored border. (The term "px" being a unit of measure for pixels and is generally understood by those of ordinary skill in the art.) Again, such values (9) are variable and may include a variety of combinations and permutations based on the website module at issue.

Figure 8:
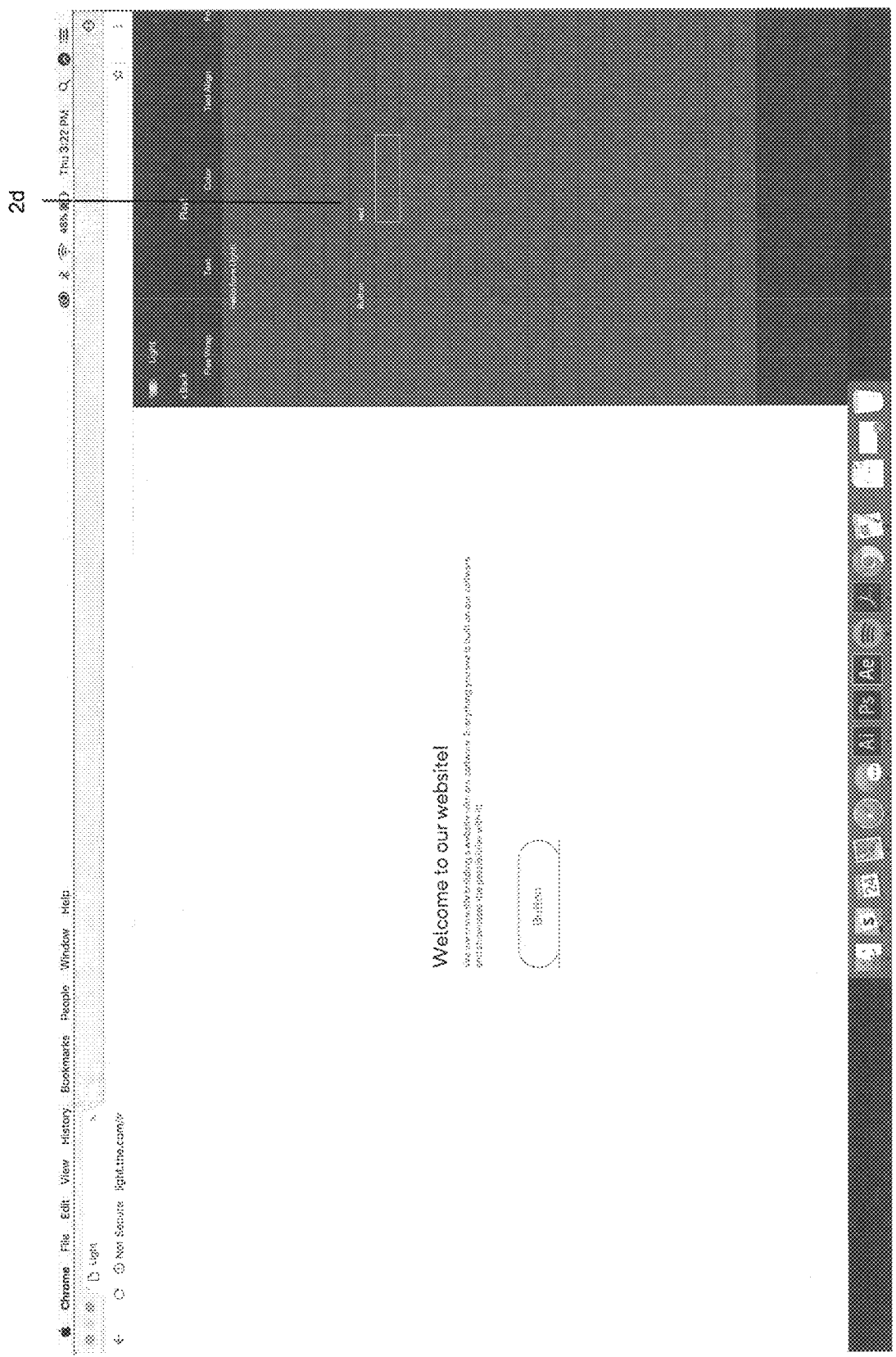
FIG. 8—is a screen capture of a cell-based computing platform as a website development and management system demonstrating a change in the website module responsive to the color of a call to action button in one embodiment thereof.
Figure 9:
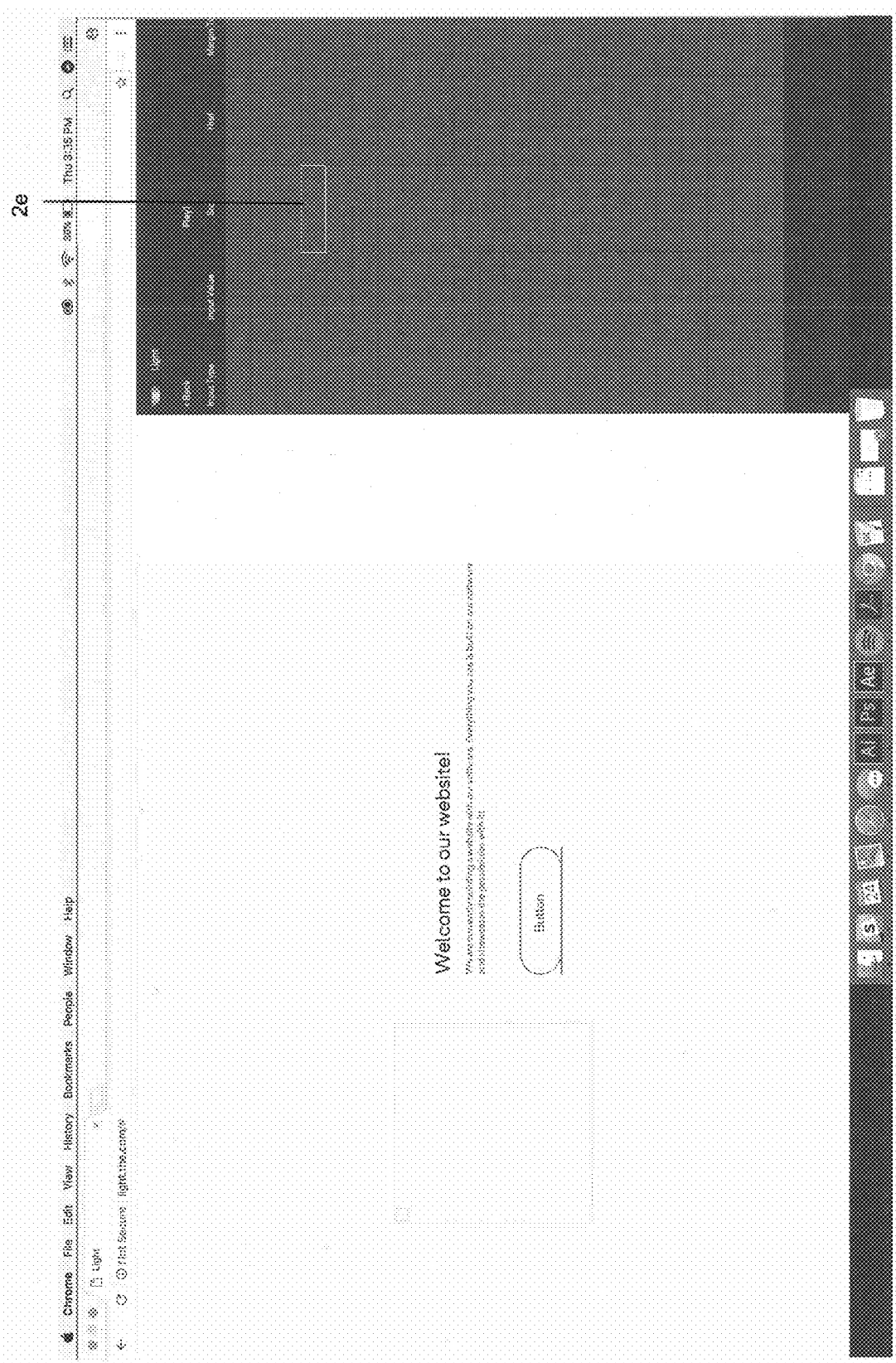
FIG. 9—is a screen capture of a cell-based computing platform as a website development and management system demonstrating a change in the website module responsive to an image display in one embodiment thereof.
Figure 10:
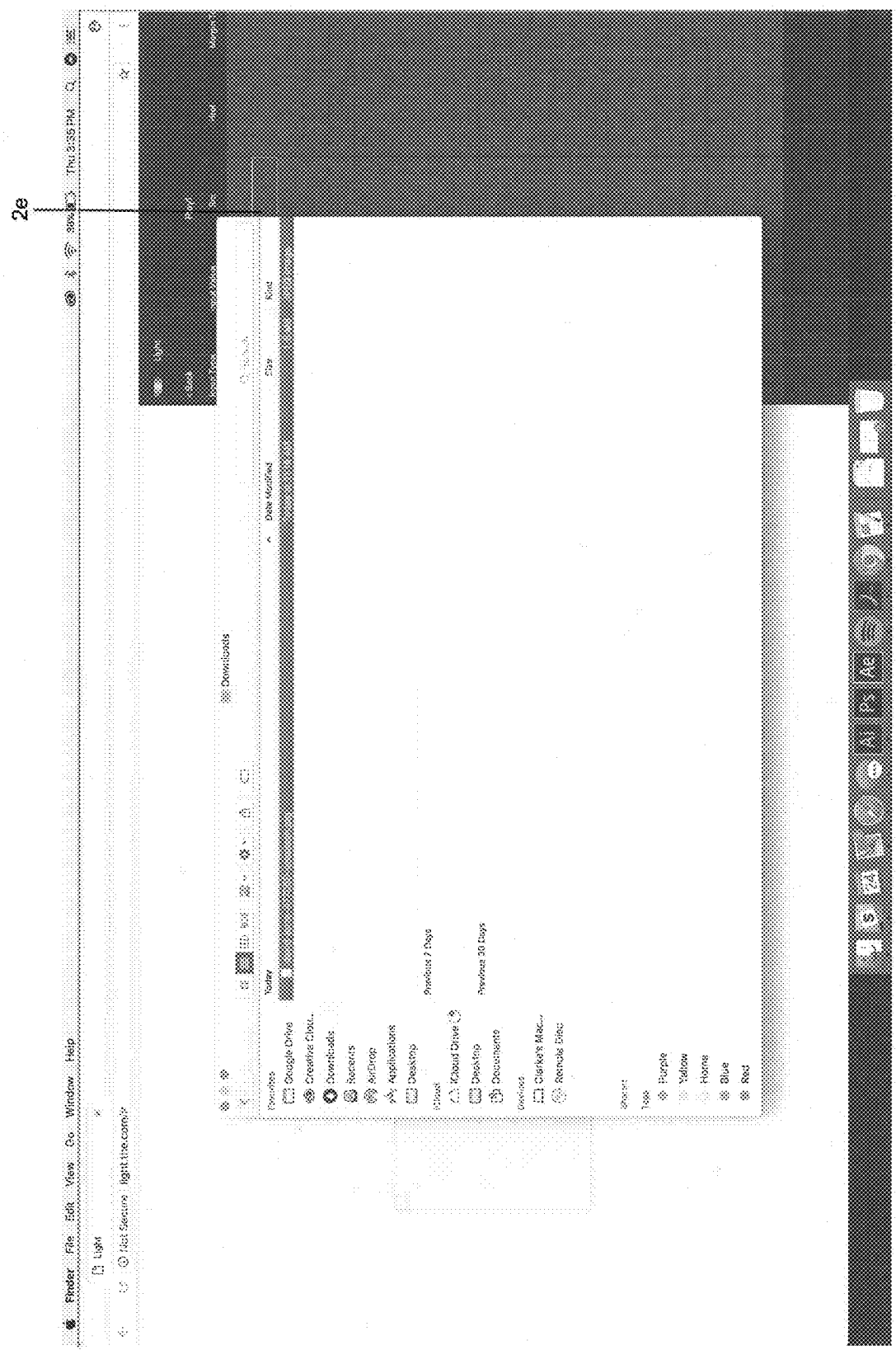
FIG. 10—is a screen capture of a cell-based computing platform as a website development and management system demonstrating the selection and uploading to a cloud-based system an image to be displayed in one embodiment thereof.
Figure 11:
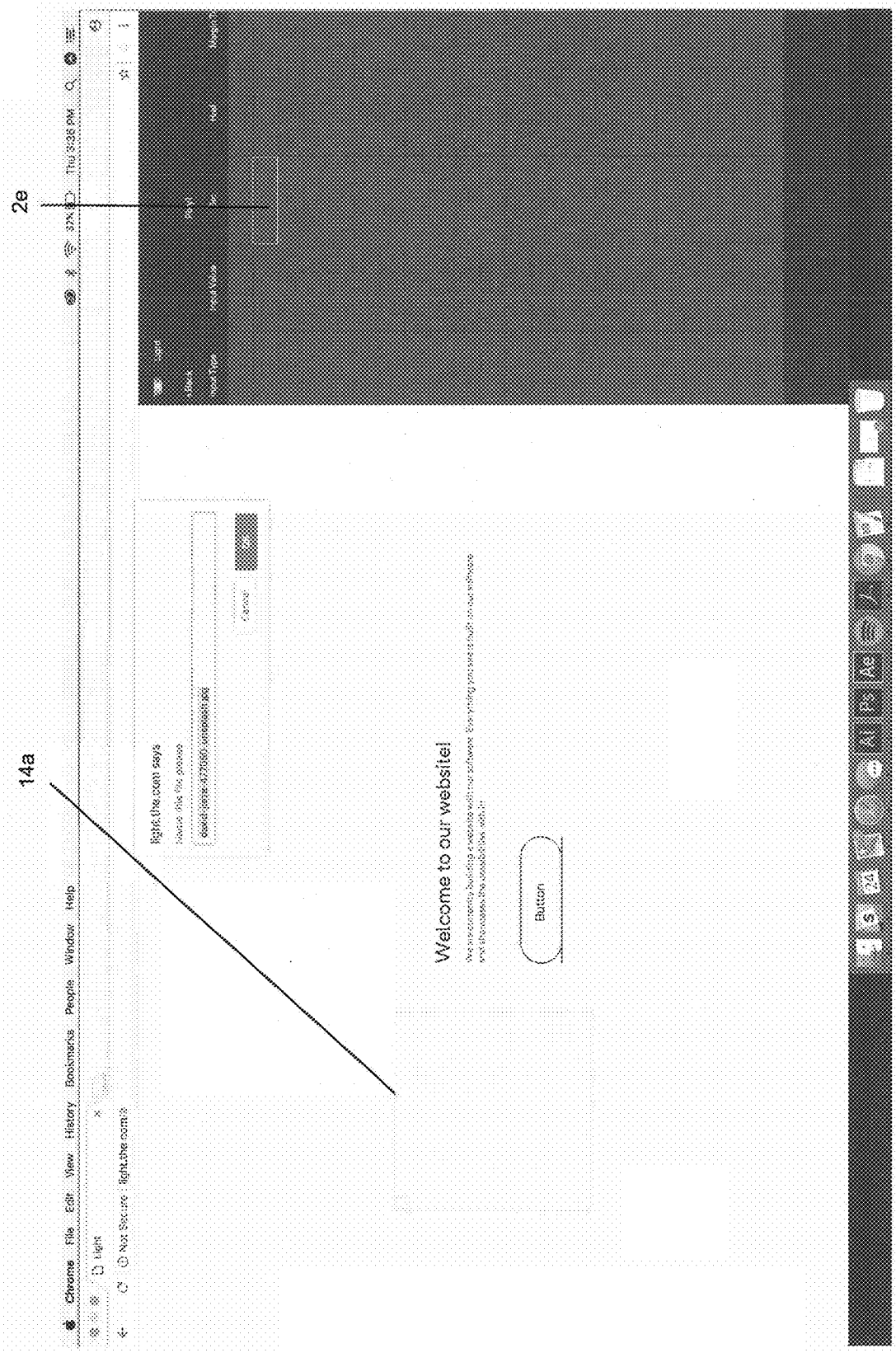
FIG. 11—is a screen capture of a cell-based computing platform as a website development and management system demonstrating the naming and uploading to a cloud-based system an image to be displayed in one embodiment thereof.
Figure 12:
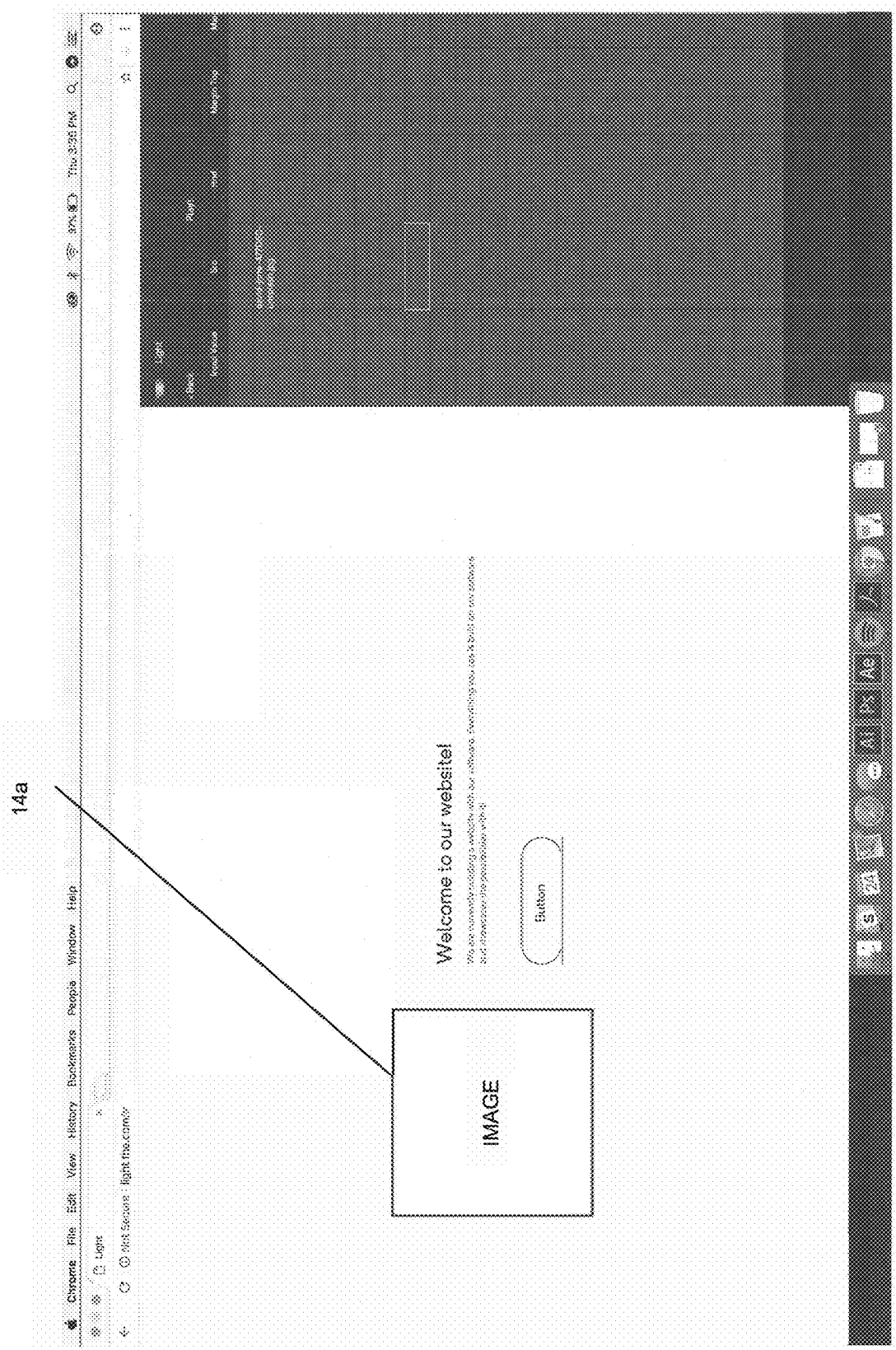
FIG. 12—is a screen capture of a cell-based computing platform as a website development and management system demonstrating an image display website module displaying an updated image in one embodiment thereof.

In another embodiment, a cell may include a value that may include an uploaded graphic and/or video element. For example, as shown in FIGS. 8-9, a cell (2) may include a value (9) of an uploaded photo that is operably linked to the "Left Col." cell of row 2 of column 1. Here, a second cell (2e), operably linked to the image located to the left of the displayed text website module may be configured to include, in this instance a customized audio visual image. As demonstrated in the sequence of FIGS. 9-12, the appropriate second cell that is operably linked to the image aspect of the "Left Col." website module is highlighted, which causes a prompt window to open. This prompt window may allow a user to search, identify and select an image or other audio or visual file. In this embodiment, as shown in FIG. 10, a .jpg file may be selected to be associated with this second cell (2e). This file may be separately named and inputted into the appropriate second cell (2e). As shown in FIG. 2, once inputted into the appropriate second cell (2e), the image is visible in the website display through an image website module (14a).

In another embodiment, the invention may include one or a plurality of nested cells that may further be dynamically linked. As initially shown in FIG. 13, the invention may include a home grouping of top-level nested cells (2f) that may be arranged through a number of identifying columns, for example, recent or favorited cells. This "home" cell grouping may further include one or more actions, such as a "logout" action cell.

Figure 13:
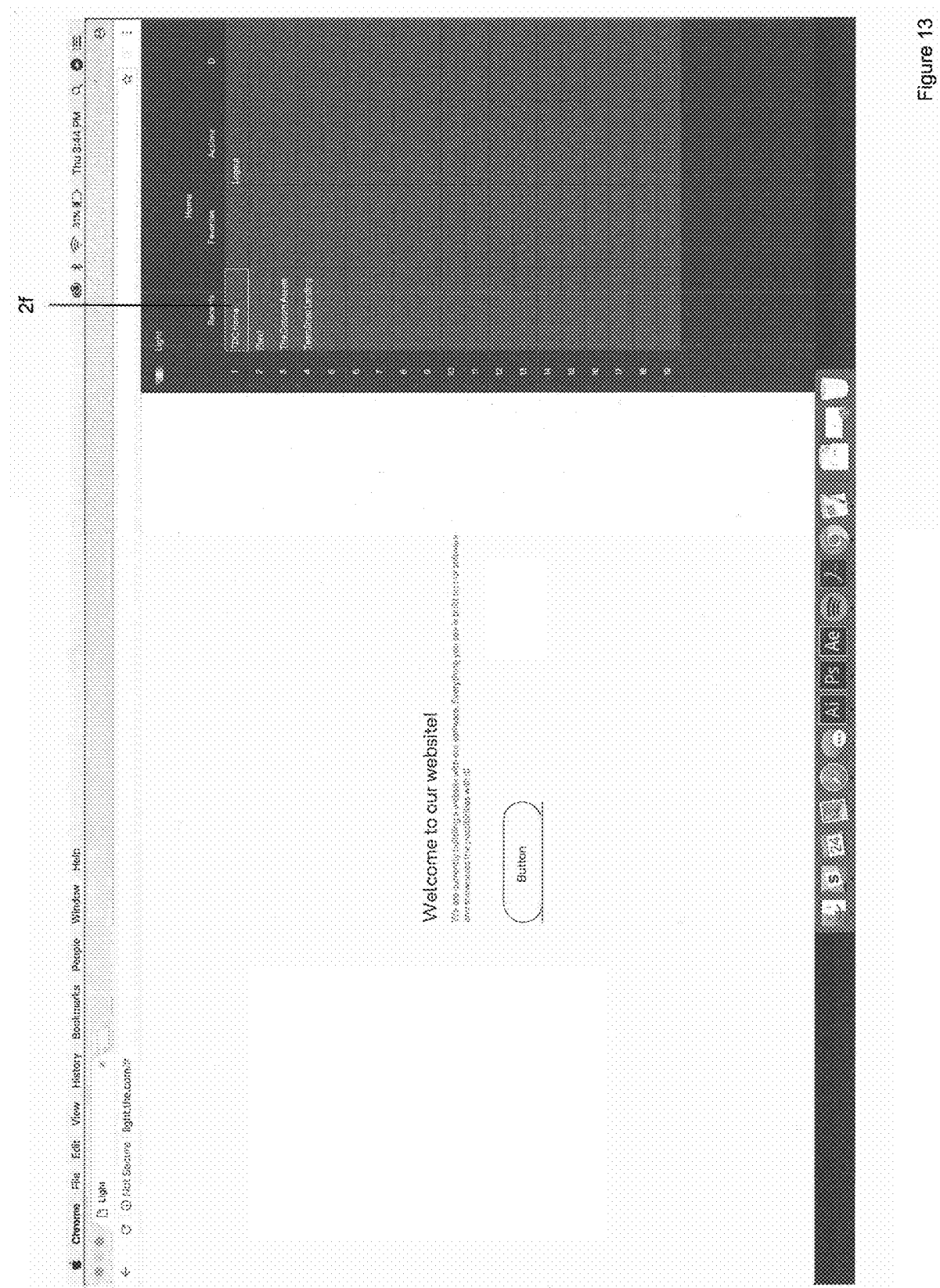
FIG. 13—is a screen capture of a cell-based computing platform as a website development and management system demonstrating a top-level nested cell in one embodiment thereof.

Again referring to FIG. 13, the invention includes one or more top-level nested (2f) and/or linked cells that may be responsive to additional cells (2) or groups of cells (2). In one preferred embodiment, a cell may include an initial top-level cell (2f), in this case identified as "TDC Home." This top-level cell (2f) may be linked to a second-level cell (2g) or group of cells identified in FIG. 14. In this preferred embodiment, the top-level nested (2f) and/or linked cells TDC Home may be engaged and access the group of second, or even third level cells that are responsive to the website. Again referring to FIG. 13, as demonstrated in column 1, the invention's cell hierarchy may include a plurality of top-level nested (2f) and/or linked cells that may correspond to distinct cells or cell groups. For example, a plurality of top-level cells (2f) may be nested and/or linked with individual webpages for a website such that a user may easily access a plurality of individual webpages from a single group of top-level cells. Additional embodiments may include top-level cells that may be linked to various actions, functions or reactions. For example, as shown in FIG. 13, in this embodiment a top-level cell identified as "The Dotcom Assets" may be linked to a cell grouping that is responsive to a separate action, function, or reaction.

Figure 14:
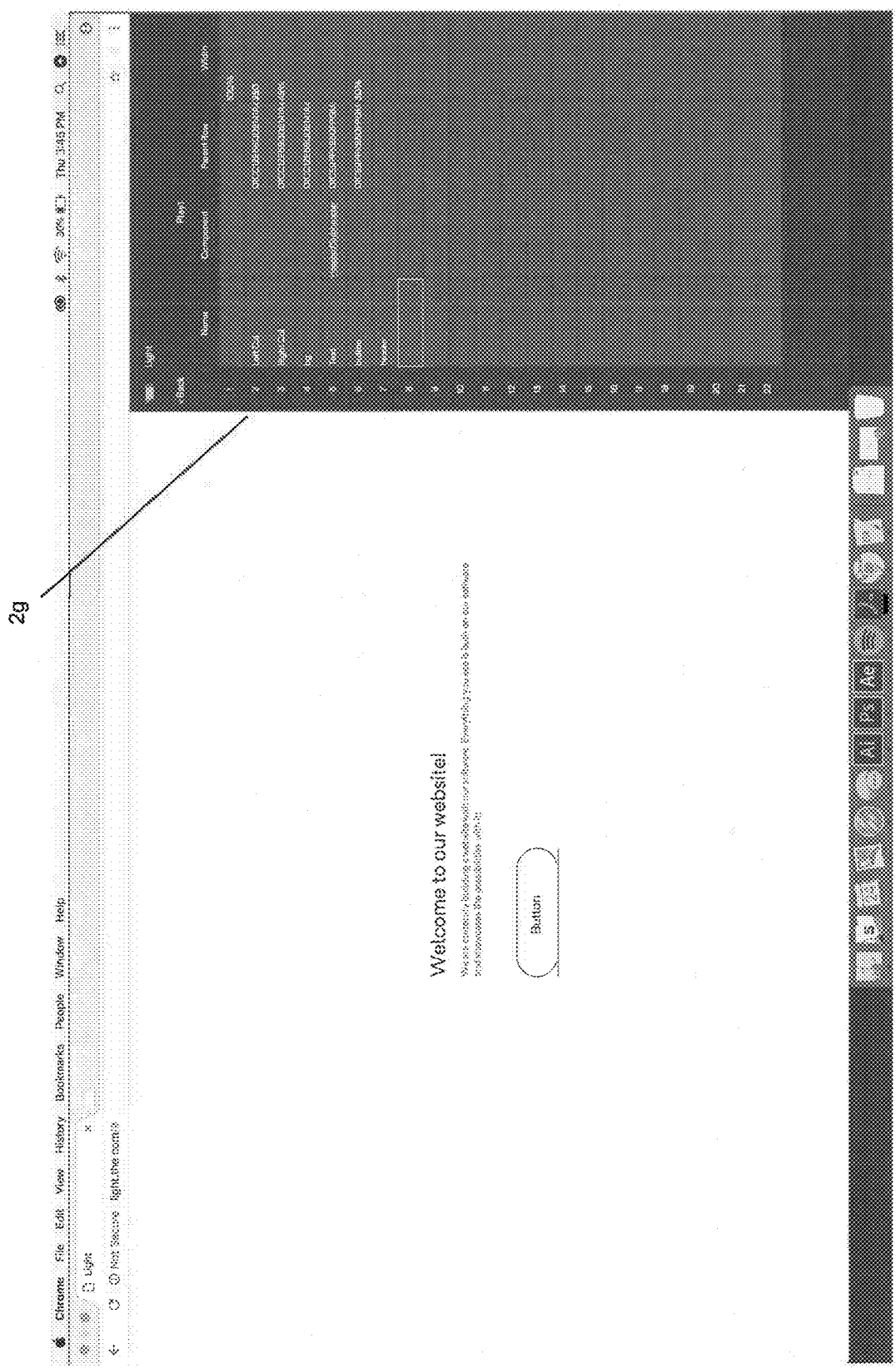
FIG. 14—is a screen capture of a cell-based computing platform as a website development and management system demonstrating a second-level nested cell in one embodiment thereof.
Figure 15:
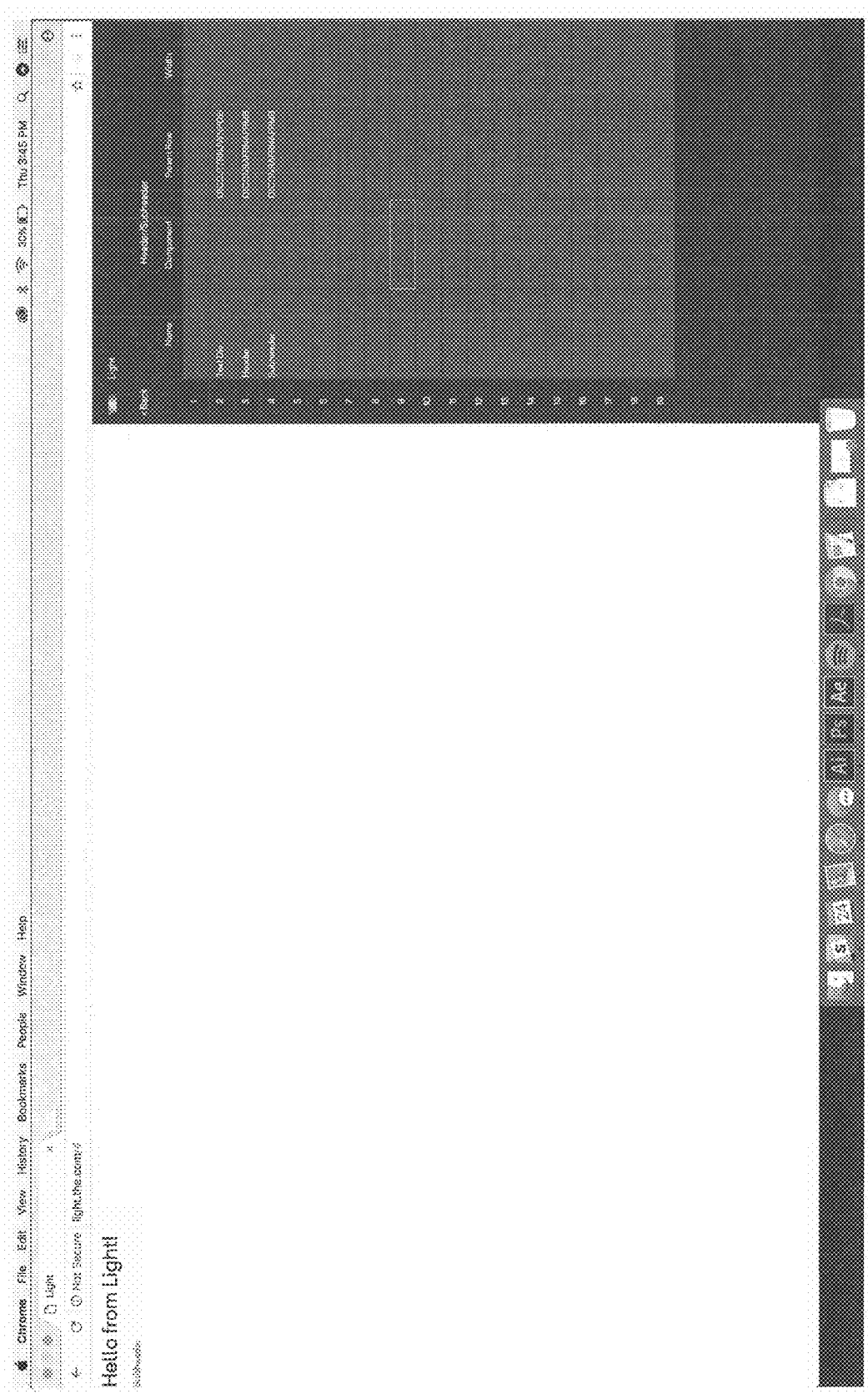
FIG. 15—is a screen capture of a cell-based computing platform as a website development and management system demonstrating a third-level nested cell in one embodiment thereof.

In certain embodiments, a second-level cell may be nested and/or linked with another third-level cell, grouping of cells or a cell matrix. As shown in FIGS. 14-15, in this preferred embodiment a cell identified in FIG. 14 as "Header/Sub-header" may be nested and/or linked with a third-level nested and/or linked cells or group of cells identified in FIG. 15. In this embodiment, the third-level cells may be responsive to the text, and in particular header and sub-header text of the website module. In this embodiment, such third-level cell or group of cells maybe also be responsive to a new website subpage or display, or may be dynamically responsive to one or more other cells on the same or different levels.

As noted above, such nested and/or linked cells may be dynamically linked so that the change in value of one or more cells may dynamically trigger a change in one or more cells in a different level. While this example identifies two levels of linked cells, it should be understood that a varying number of cell levels may be included in the invention. Such cell levels may be dynamically linked sequentially across multiple cells and/or cell layers. Additionally, such cell levels may be dynamically linked non-sequentially across multiple cells and/or cell layers.

As generally described above, in certain embodiments a cell or group of cells may be responsive to an external device, program or operation such that, for example a change in the value of a cell, may dynamically trigger a reaction in an external device, program or operation. As just one exemplary embodiment, a cell may be responsive to an inventory management system. This responsive connection may be through a direct responsive connection or through an API intermediary.

In this embodiment, when the inventory of a product is near depletion or depleted, the value of the cell may be manually or automatically changed to reflect this inventory level. When the value of the cell reaches a predetermined level, it may dynamically trigger one or more additional cells that may produce a dynamically triggered cell cascade. In one example, a dynamically triggered cell may be linked to an external inventory management system and prompt that system to report the low or depleted inventory, or to order new inventory. Another dynamically triggered cell may dynamically update a website order form or product listing, causing the website to show the product is out of stock. Yet another dynamically triggered cell may generate an email, text or other message that may be directed to a predetermined location or person identifying the low or depleted inventory.

Such dynamically triggered reactions are exemplary only as a variety of external reactions may be linked to one or a plurality of cells. Such external devices, software or operations may include external mechanical or electrical devices, general use computers, tablet or mobile devices and the software and/or hardware components that support them. The initiation of an external reaction may also not require the command to be routed through a traditional server-based architecture, but instead may incorporate a cloud-based storage system that may directly connect the cell or cell matrix with an executable command directed to an external software, operation or device.

As noted in FIG. 3, in this and other embodiments, the cell identification, or the corresponding action, function or reaction, and value may be cloud-based, such that when a user enters a URL, the cell values that make up the design, configuration and function of a website may be downloaded from a cloud-based database (5) and processed by a cell-based computing platform (1). The visual display of the website is rendered by the general use browser, such as EXPLORER®, CHROME®, FIREFOX® and/or SAFARI® and the like. As a result of this cloud-based browser rendering process, the cell-based computing platform does not require a server (4) to host, update and display the revised background color. Here, the change in the background color precipitated by the value change in the operably linked cells (2) may be instantly visible and rendered by the general computer's browser program. Moreover, as also noted above, this does not require, or use CSS code.

As used herein, a "function" means any computer executable function that may be performed by a software program in conjunction with an appropriate computing hardware device or system in response to a in the value of one or more cells.

As used herein, an "action" means any computer executable function that may be performed by a software program in conjunction with an appropriate computing hardware device or system in response to a change in the value of one or more cells.

As used herein, a "reaction" means any computer executable function that may be generated by a first system that may be transmitted by a signal to an external device having a having a computer executable function that may generate or effect a change in the state of that external device.

Naturally as can be appreciated, all of the steps as herein described may be accomplished in some embodiments through any appropriate machine and/or device resulting in the transformation of, for example data, data processing, data transformation, external devices, operations and the like. It should also be noted that in some instances software and/or software solution may be utilized to carry out the objectives of the invention and may be defined as software stored on a magnetic or optical disk or other appropriate physical computer readable media including wireless devices and/or smart phones. In alternative embodiments the software and/or data structures can be associated in combination with a computer or processor that operates on the data structure or utilizes the software. Further embodiments may include transmitting and/or loading and/or updating of the software on a computer perhaps remotely over the internet or through any other appropriate transmission machine or device, or even the executing of the software on a computer resulting in the data and/or other physical transformations as herein described.

Certain embodiments of the inventive technology may utilize a machine and/or device which may include a general purpose computer, a computer that can perform an algorithm, computer readable medium, software, computer readable medium continuing specific programming, a computer network, a server and receiver network, transmission elements, wireless devices and/or smart phones, internet transmission and receiving element; cloud-based storage and transmission systems, software updateable elements; computer routines and/or subroutines, computer readable memory, data storage elements, random access memory elements, and/or computer interface displays that may represent the data in a physically perceivable transformation such as visually displaying said processed data. In addition, as can be naturally appreciated, any of the steps as herein described may be accomplished in some embodiments through a variety of hardware applications including a keyboard, mouse, computer graphical interface, voice activation or input, server, receiver and any other appropriate hardware device known by those of ordinary skill in the art.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the statements of invention. As can be easily understood from the foregoing, the basic concepts of the present invention may be embodied in a variety of ways. It involves both techniques as well as devices to accomplish the appropriate system for providing a cell-based computing platform and the like. In this application, the cell-based computing platform and associated applications are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention may be described in method-oriented terminology, each element of the claims corresponds to a device. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting any claims. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "dynamic trigger" should be understood to encompass disclosure of the act of "dynamic triggering"—whether explicitly discussed or not—and, conversely, were there effectively disclosure of the act of "dynamic triggering", such a disclosure should be understood to encompass disclosure of a "dynamic triggering method and/or technique, and/or device." Such changes and alternative terms are to be understood to be explicitly included in the description.

Thus, the applicant(s) should be understood to have support to claim and make a statement of invention to at least: i) each of the system (with corresponding methods and apparatus) of providing a cell-based computing platform as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

In addition and as to computer aspects and each aspect amenable to programming or other electronic automation, the applicant(s) should be understood to have support to claim and make a statement of invention to at least: xvi) processes performed with the aid of or on a computer and/or controller as described throughout the above discussion, xv) a programmable apparatus as described throughout the above discussion, xvi) a computer readable memory encoded with data to direct a computer comprising elements which function as described throughout the above discussion, xvii) a computer configured as herein disclosed and described, xviii) individual or combined subroutines and programs as herein disclosed and described, xix) the related methods disclosed and described, xx) similar, equivalent, and even implicit variations of each of these systems and methods, xxi) those alternative designs which accomplish each of the functions shown as are disclosed and described, xxii) those alternative designs and methods which accomplish each of the functions shown as are implicit to accomplish that which is disclosed and described, xxiii) each feature, component, and step shown as separate and independent inventions, and xxiv) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The inventive subject matter is to include, but certainly not be limited as, a system substantially as herein described with reference to any one or more of the Figures and Descriptions (including the following: for example, the process according to any claims and further comprising any of the steps as shown in any Figures, separately, in any combination or permutation).

What is claimed is:

1. A cell-based computing system comprising:
  a computer having an executable program configured to generate and display a plurality of individual cells wherein each cell is assigned an initial value and wherein said initial values are retained in a cloud-based database;

a user interface wherein a user may modify said initial value of one or more of said plurality of cells wherein said modification of said initial value of a cell is communicated and retained in said cloud-based database;

wherein said modification of said initial value of one or more of said plurality of cells generates a signal from said cloud-based database which is received by said executable program and generates a signal that initiates a function, an action or a reaction that is executed according to the new value of one or more of said cells; and wherein said step of initiating said function, action or reaction is accomplished without communication with a physical server.

2. The cell-based computing system of claim 1 wherein said step of initiating said function, action or reaction comprises the step of generating a signal that communicates with an application programming interface (API).

3. The cell-based computing system of claim 2 wherein said API, in response to said signal, generates a signal that is communicated to an external device.

4. The cell-based computing system of claim 3 wherein said signal generated by said API communicated to an external device causes said external device to perform a function.

5. The cell-based computing system of claim 4 wherein said function performed by said external device may be selected from the group consisting of: turning itself on, turning itself on, sending a signal to another external device; initiating a computer executable program; initiating a computer executable program that generates a change in the value of one or more said plurality of cells.

6. The cell-based computing system of claim 1 wherein said plurality of individual cells comprises a plurality of nested cells.

7. The cell-based computing system of claim 6 wherein said plurality of nested cells comprises a plurality of nested cells that may be dynamically triggered.

8. The cell-based computing system of claim 1 wherein said function comprises a visual output function.

9. The cell-based computing system of claim 8 wherein said visual output function is rendered independently of a CSS code function.

10. The cell-based computing system of claim 1 wherein said cell-based computing system comprises a CSS code free cell-based computing system.

11. The cell-based computing system of claim 1 wherein said user interface wherein a user may modify said initial value of one or more of said plurality of cells comprises an automated user interface wherein a user may modify said initial value of one or more of said plurality of cells.

12. A cell-based website development system configured to generate and render a website for display without a server comprising:

a computer having an executable program configured to generate and display a plurality of individual cells wherein each cell is assigned an initial value and wherein said initial values are retained in a cloud-based database;

one or more website modules configured to be responsive to the value of one or more of said individual cells;

a user interface wherein a user may modify said initial value of one or more of said plurality of cells wherein said modification in said initial value of a cell is communicated and retained in said cloud-based database; and wherein the modification of said initial value of one or more of said plurality of cells generates a signal from said cloud-based database which is received by said executable program and causes a change in the operation of said one or more website modules and wherein said change in the operation of said one or more website modules is rendered by said computer's browser program as a website display and wherein said step of rendering said website display is accomplished without a physical server.

13. The cell-based website development system of claim 12 and further comprising the step wherein the modification of said initial value of one or more of said plurality of cells generates a signal from said cloud-based database which is received by said executable program and initiates a function, action or reaction.

14. The cell-based website development system of claim 13 wherein said step of initiating said function, action or reaction comprises the step of generating a signal that communicates with an application programming interface (API).

15. The cell-based website development system of claim 14 wherein said API, in response to said signal, generates a signal that is communicated to an external device.

16. The cell-based website development system of claim 15 wherein said signal generated by said API communicated to an external device causes said external device to perform a function.

17. The cell-based website development system of claim 12 wherein said function performed by said external device may be selected from the group consisting of: turning itself on, turning itself on, sending a signal to another external device; initiating a computer executable program;

initiating a computer executable program that generates a change in the value of one or more said plurality of cells.

18. The cell-based website development system of claim 12 wherein said plurality of individual cells comprises a plurality of nested cells.

19. The cell-based website development system of claim 18 wherein said plurality of nested cells comprises a plurality of nested cells that may be dynamically triggered.

20. The cell-based website development system of claim 12 wherein said step of rendering said website display is rendered independently of a CSS code function.

21. A dynamic cell-based computing system composing:

a computer having an executable program configured to generate and display a plurality of first cells wherein each first cell is assigned an initial value and wherein said initial values are retained in a cloud-based database;

a computer having an executable program configured to generate and display a plurality of second cells wherein each second cell is assigned an initial value and wherein said initial values are retained in a cloud-based database and further responsive to one or more of said plurality of first cells and wherein said initial values of said plurality of second cells are retained in a cloud-based database;

a user interface wherein a user may modify said initial value of one or more of said plurality of first cells wherein said modification of said initial value of a cell is communicated to said plurality of second cells causing a modification in the assigned initial value of one or more plurality of second cell and wherein the modified values of said first and second plurality of cells is communicated and retained in said cloud-based database;

wherein said modification of said initial value of one or more of said plurality of cells generates a signal from said cloud-based database which is received by said executable program and generates a signal that initiates a function, an action or a reaction that is executed according to the new value of one or more of said cells; and wherein said step of initiating said function, action or reaction is accomplished without communication with a physical server.

* * * * *